United States Patent

Daniels

[15] 3,644,851

[45] Feb. 22, 1972

[54] FIVE-PORT GYRATOR CIRCUIT WHEREIN GYRATOR ACTION IS PRODUCED BETWEEN TWO NONTERMINATED PORTS

[72] Inventor: Richard W. Daniels, Andover, Mass.

[73] Assignee: Bell Telephone Laboratories, Incorporated, Murray Hill, N.J.

[22] Filed: May 2, 1969

[21] Appl. No.: 821,359

[52] U.S. Cl. ............................333/80 R, 307/295, 333/80 T

[51] Int. Cl. ..........................................................H03h 7/44

[58] Field of Search...........................................333/80, 80 T

[56] References Cited

UNITED STATES PATENTS 3,478,226 11/1969 New et al.................................333/80

*Primary Examiner*—Herman Karl Saalbach
*Assistant Examiner*—Paul L. Gensler
*Attorney*—R. J. Guenther and E. W. Adams, Jr.

[57] ABSTRACT

A class of gyrator circuits is disclosed which is defined by a set of four matrix equations through the use of a five-port network analysis. The identifying characteristics of this class are that each circuit contains three resistors which form terminations of three of the ports in the five-port network and that gyrator action is produced between the remaining two ports only when the resistances of two of the resistors are tuned to be substantially equal. Because of this tuning ability high-quality gyrator networks may be simulated.

10 Claims, 7 Drawing Figures

INVENTOR
R. W. DANIELS
BY Leonard H. Arnold
ATTORNEY $$\begin{bmatrix} V_1 \\ V_2 \end{bmatrix} = \begin{bmatrix} Z_4 - Z_5 & -Z_3 \\ Z_4 & 0 \end{bmatrix} \begin{bmatrix} I_1 \\ I_2 \end{bmatrix}$$

$V_1 = V_3 - V_4 + V_5 \qquad V_2 = -V_4$ $I_3 = I_2 \qquad I_4 = I_1 \qquad I_5 = I_1$ $$\begin{bmatrix} V_1 \\ V_2 \end{bmatrix} = \begin{bmatrix} Z_5 - Z_4 & -Z_3 \\ Z_4 & 0 \end{bmatrix} \begin{bmatrix} I_1 \\ I_2 \end{bmatrix}$$

$V_1 = V_3 + V_4 + V_5 \qquad V_2 = -V_4$ $I_1 = I_4 = -I_5 \qquad I_2 = I_3$ $$\begin{bmatrix} V_1 \\ V_2 \end{bmatrix} = \begin{bmatrix} Z_3 - Z_5 & -Z_3 \\ Z_4 & 0 \end{bmatrix} \begin{bmatrix} I_1 \\ I_2 \end{bmatrix}$$

$V_1 = V_3 + V_5 \qquad V_2 = -V_4$ $I_1 = I_4 = I_5 \qquad I_3 = -I_1 + I_2$ $$\begin{bmatrix} V_1 \\ V_2 \end{bmatrix} = \begin{bmatrix} Z_5 - Z_3 & -Z_3 \\ Z_4 & 0 \end{bmatrix} \begin{bmatrix} I_1 \\ I_2 \end{bmatrix}$$

$V_1 = V_3 + V_5 \qquad V_2 = -V_4$ $I_1 = I_4 = -I_5 \qquad I_3 = I_1 + I_2$

FIVE-PORT GYRATOR CIRCUIT WHEREIN GYRATOR ACTION IS PRODUCED BETWEEN TWO NONTERMINATED PORTS

BACKGROUND OF THE INVENTION

This invention relates generally to nonreciprocal electric networks and, more particularly, to gyrator circuits.

Broadly speaking, network synthesis may be defined as "the methods by which an electric network can be formed to realize a prescribed characteristic." (K. L. Su, "Active Network Synthesis", pg. 1, McGraw Hill, Inc., 1965.) In the past, network synthesis was based on the existence of simple circuit elements, such as resistors, capacitors, inductors and transformers. But, with the advent of modern synthesis techniques many new elements having specialized electrical characteristics were developed. Some of these, such as the negative resistance, the nullator, norator, circulator and gyrator are described simply by Su at pgs. 8–39 in the above-mentioned article.

The gyrator was first described theoretically as early as 1948 by B. Tellegen in "The Gyrator, A New Electric Network Element", *Philips Research Reports*, Vol. 3, No. 2, pgs. 81–101 (1948). It is defined as a four-terminal, two-port network which satisfies the following matrix equation:

$$\begin{bmatrix} V_1 \\ V_2 \end{bmatrix} = \begin{bmatrix} O & -R_1 \\ +R_2 & O \end{bmatrix} \begin{bmatrix} I_1 \\ I_2 \end{bmatrix} \quad (1)$$

Equation (1) above is equivalent to the following pair of equations:

$$V_1 = -I_2 R_1 \quad (2)$$

$$V_2 = I_1 R_2 \quad (3)$$

where $I_1$ is current into and $V_1$ is the voltage across the two terminals constituting one port, and $I_2$ is the current into and $V_2$ is the voltage across the two terminals constituting the second port. As may be noted from equations (2) and (3), the gyrator associates its name with the fact that it "gyrates" an input voltage into an output current and vice versa.

In an ideal gyrator the input impedance, measured at the input terminals with the output terminals open circuited, and the output impedance, measured at the output terminals with the input terminals open circuited, are equal to zero. This condition is indicated by the two zero terms in matrix equation (1) above. $R_1$ and $R_2$ in equations (2) and (3) above are transfer impedances whose product determines the gyration constant K. In an ideal passive gyrator circuit as defined by Tellegen in the above-cited article, the transfer impedances $R_1$ and $R_2$ are equal. In general these impedances may be unequal and in such a case the gyrator is termed an active network.

The gyrator is important in network synthesis because it is one of the simplest and most basic nonreciprocal networks from which other nonreciprocal networks such as the circulator can be formed. In simple terms, a network is reciprocal when a voltage source inserted in one part of the network produces a current at some other part of the network such that the ratio of the applied voltage to the measured current, called the transfer impedance, will be the same if the relative positions of the driving source and the measured effect are reversed. Electrical networks which contain only resistors, capacitors, inductors and transformers generally are reciprocal networks. The gyrator, however, is always nonreciprocal since the transfer impedance for one direction of propagation always differs in sign from that for propagation in the reverse direction, as demonstrated by the different signs in equations (2) and (3) above. A gyrator may be further nonreciprocal in that the magnitude of the transfer impedances, $R_1$ and $R_2$, in equations (2) and (3) may in general be unequal.

In practical application the gyrator is important as a positive impedance inverter. That is, if an impedance $+Z$ is connected between one pair of terminals, the impedance measured at the other terminals is proportional to $+1/Z$. Thus, for example, if the gyrator network defined by equations (2) and (3) is terminated with an output impedance $Z_{out}$, the input impedance will be defined by equation (4):

$$Z_{in} = R_1 R_2 / Z_{out} = K / Z_{out} \quad (4)$$

where $K$ is again the gyration constant. As a result, a capacitor with an impedance $1/j\omega C$ can be made to appear as an inductor with an impedance $j\omega KC$. This result is particularly significant in the integrated circuit art because the inductor has been especially difficult to realize with known integrated techniques.

A number of gyrator circuits which approximate the characteristics of the ideal gyrator have been disclosed in the prior art. The quality of each of these circuits is determined by measuring the input and output open circuit impedances. The closer the product of these values is to zero the more the circuit approximates the ideal gyrator. For the most part, the actual value of the input and output impedances in these prior art circuits is fixed by the intrinsic nature of each circuit. By contrast the subject of the present invention is a class of gyrator networks wherein the input or output impedance in matrix equation (1) is tuned to zero simply by adjusting the impedances of a pair of resistors in the network.

SUMMARY OF THE INVENTION

The present invention is a class of tunable gyrator circuits defined by four matrix equations:

$$\begin{bmatrix} V_1 \\ V_2 \end{bmatrix} = \begin{bmatrix} Z_4 - Z_5 & -Z_3 \\ Z_4 & O \end{bmatrix} \begin{bmatrix} I_1 \\ I_2 \end{bmatrix} \quad (5)$$

$$\begin{bmatrix} V_1 \\ V_2 \end{bmatrix} = \begin{bmatrix} Z_5 - Z_4 & -Z_3 \\ Z_4 & O \end{bmatrix} \begin{bmatrix} I_1 \\ I_2 \end{bmatrix} \quad (6)$$

$$\begin{bmatrix} V_1 \\ V_2 \end{bmatrix} = \begin{bmatrix} Z_3 - Z_5 & -Z_3 \\ Z_4 & O \end{bmatrix} \begin{bmatrix} I_1 \\ I_2 \end{bmatrix} \quad (7)$$

$$\begin{bmatrix} V_1 \\ V_2 \end{bmatrix} = \begin{bmatrix} Z_5 - Z_3 & -Z_3 \\ Z_4 & O \end{bmatrix} \begin{bmatrix} I_1 \\ I_2 \end{bmatrix} \quad (8)$$

This class of gyrator circuits forming the subject of the present invention is developed through the use of a five-port analysis. In the above equations $V_1$ is the voltage across the two terminals constituting a first port of a five-port network and $V_2$ is the voltage measured across the two terminals constituting a second port of the network. $I_1$ is the current into the network at the port where $V_1$ is applied and $I_2$ is the current into the network at the port where $V_2$ is measured. Impedances $Z_3$, $Z_4$ and $Z_5$ above are terminations of the three remaining ports of the five-port network. Gyrator action is produced between the first and second ports when the impedances $Z_3$, $Z_4$ and $Z_5$ are maintained at specified relative values.

In accordance with the present invention each of the matrix equations shown above implies a set of voltage and current equations for a five-port network. Utilizing these equations wit basic synthesis techniques yields a great number of alternative networks in the above-defined class which produce gyrator action when terminated with impedances $Z_3$, $Z_4$ and $Z_5$.

The identifying characteristics of the class of gyrator circuits defined by the above equations are that each circuit contains three resistors, designated $Z_3$, $Z_4$ and $Z_5$, and that gyrator action is produced only when the resistance of $Z_5$ is equal to either $Z_3$ or $Z_4$. Specifically, in one pair of embodiments of the invention, as defined by matrix equations (5) and (6), the resistance of $Z_5$ is equal to $Z_4$ and in another pair of embodiments of the invention as defined by equations (7) and (8) the resistance of $Z_5$ is equal to $Z_3$. By tuning resistors $Z_3$, $Z_4$ and $Z_5$ high-quality gyrator action may be produced between the first and second ports of the five-port network described above. This tuning of resistors $Z_3$, $Z_4$ and $Z_5$ forces the critical upper left-hand term of matrix equations (5), (6), (7) and (8) to be substantially equal to zero. As a result, the quality of the networks in the class are dependent on the value of specific resistors so that the characteristics of the ideal gyrator may be more closely approximated by controlling these values. Since there is no requirement that $Z_3$ equal $Z_4$ the class of gyrator circuits described above may be either active or passive.

DETAILED DESCRIPTION

Figure 1:
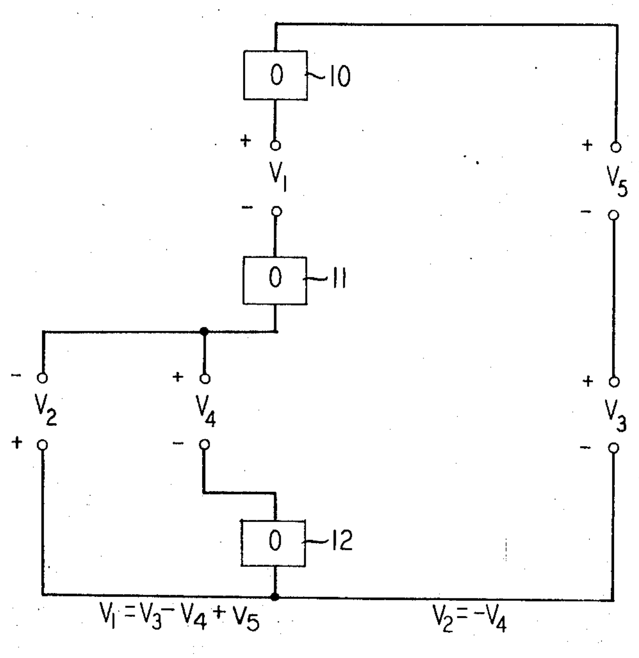
FIG. 1 is a schematic diagram of a nullator model illustrating the synthesis technique used in the present invention.

A generalized two-port network may be defined by the following matrix equation:

$$\begin{bmatrix} V_1 \\ V_2 \end{bmatrix} = \begin{bmatrix} Z_{11} & Z_{12} \\ Z_{21} & Z_{22} \end{bmatrix} \begin{bmatrix} I_1 \\ I_2 \end{bmatrix} \quad (9)$$

This matrix equation is equivalent to the following pair of equations:

$$V_1 = Z_{11}I_1 + Z_{12}I_2 \quad (10)$$

$$V_2 = Z_{21}I_1 + Z_{22}I_2 \quad (11)$$

where $I_1$ is the current into and $V_1$ is the voltage across two terminals constituting one port and $I_2$ is the current into and $V_2$ the voltage across two terminals constituting the second port. $Z_{11}$ is equal to the open circuit impedance at the first port and $Z_{22}$ is the open circuit impedance at the second port. $Z_{12}$ is the transfer impedance from port 1 to port 2. $Z_{21}$ is the transfer impedance from port 2 to port 1.

In the ideal gyrator as defined by equations (1), (2) and (3) above, the input and output open circuit impedances, $Z_{11}$ and $Z_{22}$, are equal to zero and transfer impedance $Z_{12}$ is negative. With these constraints equations (9), (10) and (11) above may be altered to the form shown in equations (2), (3) and (4) above.

In all realizable circuits the characteristics of the ideal gyrator may only be approximated, and, as a consequence, $Z_{11}$ and $Z_{22}$ are not in fact equal to zero. In order to compensate for the deficiencies inherent in conventional gyrator circuits, a five-port analysis is used in accordance with the present invention to describe a class of gyrator circuits wherein the input open circuit impedance $Z_{11}$ is tuned to a value substantially at zero by adjusting the impedance value of a pair of resistors in the network.

Matrix equations (5), (6), (7) and (8) above reflect this tuning action. Inspection of the matrix equations shows that the $Z_{11}$ term in each equation may be tuned to zero by adjusting the resistances of $Z_3$, $Z_4$ and $Z_5$. In matrix equations (5) and (6) $Z_4$ must equal $Z_5$ and in matrix equations (7) and (8) $Z_3$ must equal $Z_5$. Because of this feature the networks in the class may be controlled so that high quality inductors are simulated.

In accordance with the analysis applied in the present invention each of the impedance terms in matrix equations (5), (6), (7) and (8) above constitutes a termination of one port of a five-port network. When viewed as such, each matrix equation shown above implies a set of voltage and current equations for a five-port network. As described in detail below, each set of voltage and current equations is utilized with basic synthesis techniques to yield a great number of alternative networks which produce gyrator action when terminated with impedances $Z_3$, $Z_4$ and $Z_5$.

Applying the analysis described above and considering $Z_3$, $Z_4$ and $Z_5$ as terminations of ports 3, 4 and 5 of a five-port network yields the following voltage and current relationships at ports 3, 4 and 5:

$$Z_3 = -(V_3/I_3) \quad (12)$$

$$Z_4 = (V_3/I_3) \quad (13)$$

$$Z_5 = (V_5/I_5) \quad (14)$$

where $V_3$, $V_4$, $V_5$ are the voltages across and $I_3$, $I_4$ and $I_5$ the currents into correspondingly numbered ports 3, 4 and 5. The negative term in equations (12), (13) and (14) appears because of the assumed direction of current flow at ports 3, 4 and 5.

Substituting these voltage and current terms for the impedance terms in the embodiment of the invention described by matrix equation (5) implies a set of voltage and current equations for a five-port network which may be grouped as follows:

$$V_1 = V_3 - V_4 + V_5 \quad (15)$$

$$V_2 = -V_4 \quad (16)$$

$$I_3 = I_2 \quad (17)$$

$$I_4 = I_1 \quad (18)$$

$$I_5 = I_1 \quad (19)$$

Equations (15), (16), (17), (18) and (19) may be synthesized ideally through the use of basic theoretical building blocks known as nullators and norators. The nullator is a two-terminal element which is symbolized by a block having two terminals and containing the symbol zero. Its characteristics are that it acts as an open circuit for current and a short circuit for voltage between its two terminals. The norator is also a two-terminal element. It is symbolized by a block having two terminals and containing the symbol ∞. Its characteristics are that the current through the element and the voltage across the element are arbitrary, i.e., they are determined by the remainder of the circuitry rather than by the element itself. These basic building blocks are defined by K. L. Su in his treatise cited above, and also by S. K. Mitra, "Analysis and Synthesis of Linear Active Networks", *John Wiley & Sons*, 1969, at pgs. 54–75.

By utilizing these basic theoretical building blocks an ideal network may be generated which satisfies the above set of voltage and current equations. An illustration of the manner in which the nullator element may be used to synthesize voltage equations (15) and (16) is shown in FIG. 1. The five ports of the network in FIG. 1 are shown containing voltages $V_1$, $V_2$, $V_3$, $V_4$ and $V_5$. Each port contains two terminals, one terminal being assigned a positive voltage reference and the other terminal being assigned a negative voltage reference.

Nullator elements 10, 11 and 12 are used in the network in FIG. 1. Nullator element 10 is connected from the positive terminal of port 1 to the positive terminal of port 5. Nullator element 11 is connected from the negative terminal of port 1 to the positive terminal of port 4, and nullator element 12 is connected from the negative terminal of port 4 to the positive terminal of port 2 and the negative terminal of port 3. The negative terminal of port 2 is connected directly to the positive terminal of port 4 and nullator element 11, while the negative terminal of port 5 is connected directly to the positive terminal of port 3.

Since nullator element 12 is a short circuit for voltage it may readily be seen that $V_2 = -V_4$ so that equation (16) is satisfied. Similarly, since nullator elements 10 and 11 are short circuits for voltage it may be readily seen by Kirchhoff's voltage law that $V_1 = V_3 - V_4 + V_5$ so that equation (15) is satisfied. Of course it may be noted at this point that many other nullator elements might be used in the circuit shown in FIG. 1 to satisfy equations (15) and (16). For example, one nullator element might be added in the path between the positive terminal of port 3 and the negative terminal of port 5, and another nullator element might be added between the negative terminal of port 3 and the junction of nullator 12 with the positive terminal of port 2. For simplicity of illustration only three nullator elements have been shown. As will be appreciated from the discussion below, the use of a greater number is merely illustrative of the same synthesis technique which yields alternative gyrator circuits of the same type as defined by matrix equation (5).

Figure 2:
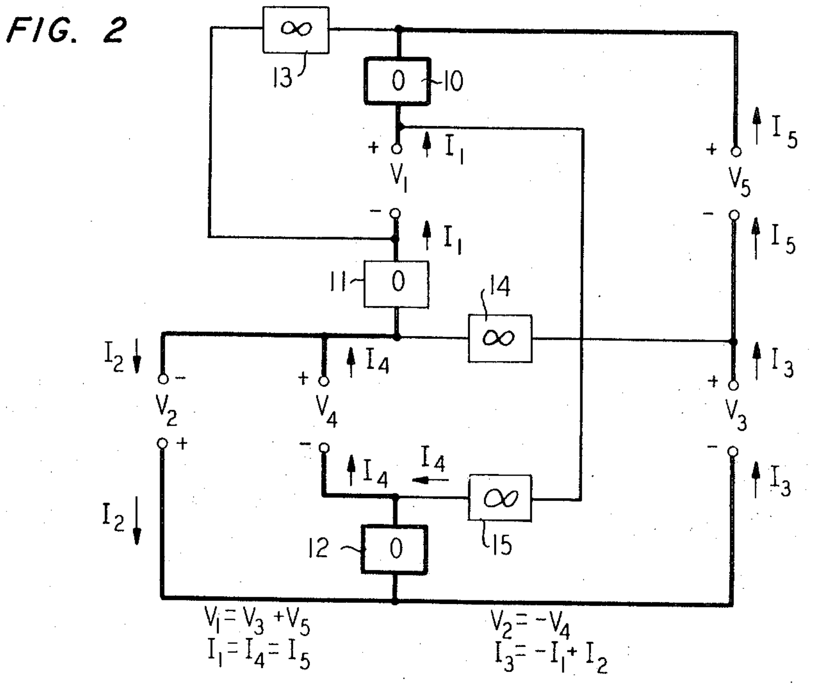
FIG. 2 is a schematic diagram of a nullator-norator model further illustrating the synthesis technique used in the present invention.

In FIG. 2 the nullator network of FIG. 1 is utilized with three norator elements 13, 14 and 15 in order to realize current equations (17), (18) and (19) above. Current $I_1$ is assumed to flow away from the positive terminal of port 1 and into the negative terminal of port 1. Similarly, currents $I_2$, $I_3$, $I_4$ and $I_5$, respectively, are assumed to flow away from the positive terminals of ports 2, 3, 4 and 5 and into the negative terminals of ports 2, 3, 4 and 5. Norator element 13 is added between the positive terminal of port 5 and the negative terminal of port 1 in order to permit $I_1$ to equal $I_5$ and thereby satisfy equation (19). As may be appreciated in the configuration shown in FIG. 2, $I_1$ must equal $I_5$ because current $I_1$ cannot flow through nullators 10 and 11. In addition, norator 15 is added in a path between the positive terminal of port 1 and the negative terminal of port 4 in order to permit current $I_1$ to equal current $I_4$ and thereby satisfy equation (18). Again, current $I_1$ must equal $I_4$ because current cannot flow through nullators 10 and 12. As may be seen, equation (17), wherein $I_2=I_3$, is inherently satisfied by the nullator arrangement described in FIG. 1 because the positive terminal of port 2 is directly connected to the negative terminal of port 3. However, if no other connections were established current $I_3$ would also equal current $I_5$ because there is a direct connection between the positive terminal of port 3 and the negative terminal of port 5. Because this is a condition that is not specified by equations (15), (16), (17), (18) and (19), an additional connection is made in order to ensure that only those equations derived from matrix equation (4) are satisfied. Thus, nullator 14 permits current $I_3$ and $I_5$ to flow between the positive terminal of port 3 and the positive terminal of port 4 without disturbing any of the other voltage and current relationship satisfied previously. Again it should be noted generally that the norator arrangement utilized with the three nullator circuits may be varied in accordance with the equations described above, and that additional nullator and norator elements in different configurations may be used in the same manner as described in FIG. 2 to satisfy equations (15), (16), (17), (18) and (19). The specific circuit shown in FIG. 2 is only one such arrangement that is used for brevity and simplicity to illustrate the principles embodying the invention.

Figure 3:
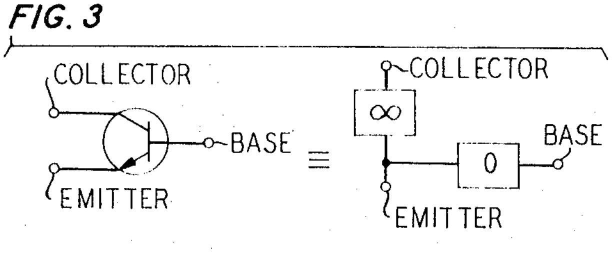
FIG. 3 is a schematic diagram illustrating the equivalence between an ideal transistor and the nullator-norator elements shown in FIG. 2.

FIG. 3 shows how the conventional transistor model, containing base, collector and emitter electrodes, is equivalent to a nullator-norator pair. In ideal operation, the voltage, $V_{be}$, from the base to the emitter of a conventional transistor is equal to zero. In addition, the emitter current, $I_e$, is equal to the collector current, $I_c$. It may be appreciated from this discussion that a nullator may be connected from the base to the emitter terminal to satisfy the voltage equation $V_{be}=0$. Similarly, a norator may be connected between the collector and emitter in order to satisfy the equation $I_c=I_b$ since all current at the collector cannot flow through the nullator at the base. Such a model of nullator-norator pairs which approximates the characteristics of the transistor is well known in the art, as shown by S. K. Mitra in the above-cited treatise. Applying this basic model shown in FIG. 3 to the nullator-norator circuit shown in FIG. 2 yields the transistor circuit shown in FIG. 4.

Figure 4:
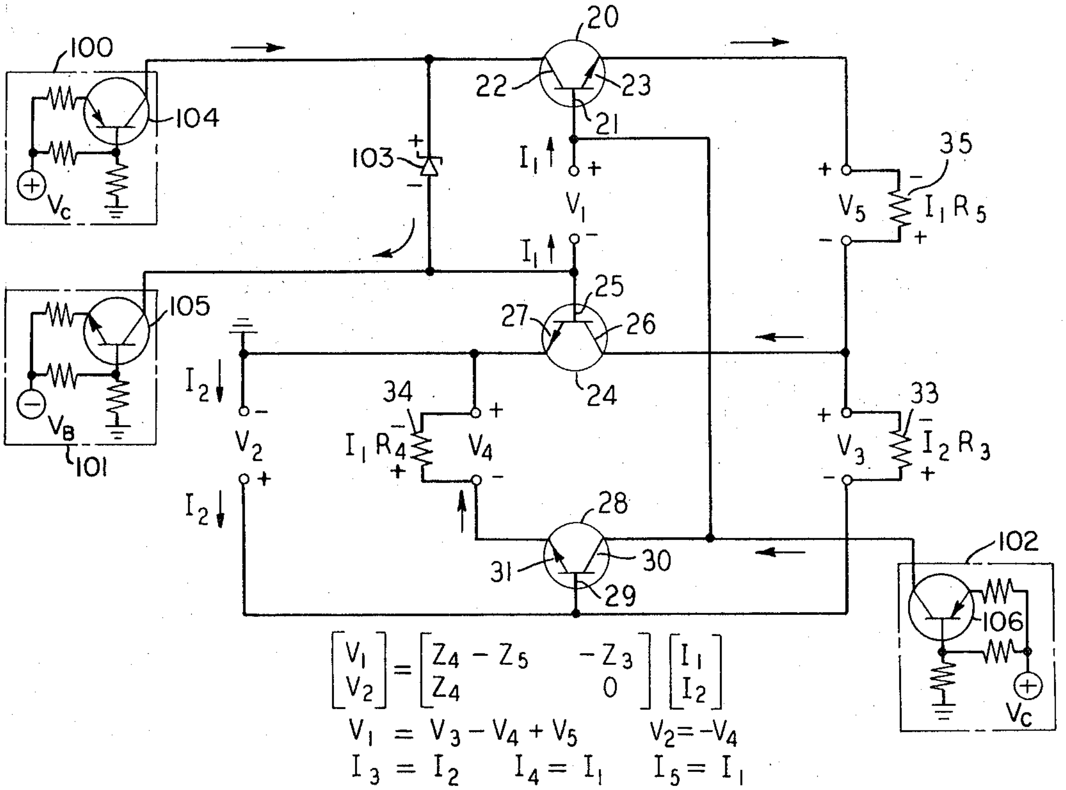
FIG. 4 is a schematic diagram of a gyrator circuit illustrating one embodiment of the invention.

FIG. 4 is a three-transistor network which realizes the nullator-norator model shown in FIG. 2. In FIG. 4 each nullator-norator pair of FIG. 2 is replaced by a transistor in the manner shown by the equivalence relationship in FIG. 3. Transistor 20 having a base 21, a collector 22 and an emitter 23 shown in FIG. 4 replaces nullator 10 and norator 13 shown in FIG. 2. Transistor 24 having a base 25, collector 26 and emitter 27 replaces nullator 11 and norator 14. Transistor 28 having base 29, collector 30 and emitter 31 replaces nullator 12 and norator 15. The connections between the five ports shown in FIG. 4 correspond to identical connections in the nullator-norator model shown in FIG. 2. Specifically, collector 22 of transistor 20 is connected directly to the negative terminal of port 1 and base 25 of transistor 24. Emitter 23 of transistor 20 is connected directly to the positive terminal of port 5. Base 21 of transistor 20 and the positive terminal of port 1 are connected directly to collector 30 of transistor 28. Emitter 27 of transistor 24 and the positive terminal of port 4 are connected directly to the negative terminal of port 2. Collector 26 of transistor 24 is connected directly to the negative terminal of port 5 and the positive terminal of port 3. Base terminal 29 of transistor 28 is connected directly to the positive terminal of port 2 and the negative terminal of port 3, while emitter 31 of transistor 28 is connected directly to the negative terminal of port 4. Resistors 33, 34 and 35 having resistances of $R_3$, $R_4$ and $R_5$, respectively, are shown connected respectively to ports 3, 4 and 5 in order to be consistent with the general scheme described above.

Considering resistances $R_3$, $R_4$ and $R_5$ equal to impedances $Z_3$, $Z_4$ and $Z_5$ yields the following pair of equations from matrix equation (5):

$$V_1=(R_4-R_5)I_1-R_3I_2 \quad (20)$$

$$V_2=R_4I_1 \quad (21)$$

when $R_4$ equals $R_5$, equations (20) and (21) simplify to the form shown in equations (2) and (3) for the ideal gyrator. That the illustrative circuit shown in FIG. 4 satisfies equations (20) and (21) and produces gyrator action when $R_4$ equals $R_5$ may be shown by the following analysis.

Assume ideal transistors are used, i.e., that the base current, $I_b$, equals zero, that the voltage between the base and emitter electrodes, $V_{be}$, equals zero, and that the emitter current $I_e$ is equal to the collector current $I_c$. By convention, the direction of the arrows on emitter electrodes 23, 27 and 31 of transistors 20, 24 and 28 are defined to be in the direction in which direct current will flow through these electrodes. However, once the transistor is properly biased in its operating range, alternating current signal may be assumed to flow in either direction from the emitter to the collector with the only constraint being that $I_e=I_c$ as defined above for the ideal transistor. The biasing circuitry is not shown in FIG. 4 but the embodiments disclosed may be biased by a variety of alternative means which are well known in the art. Accordingly, for clarity such circuitry has been omitted and it may be assumed that the transistors are properly biased.

To be consistent with the nullator-norator model shown in FIG. 3, the voltages at the five ports in FIG. 4 are assumed to appear in the direction as shown. In addition, current $I_1$ and $I_2$ are shown flowing away from the positive terminals and into the negative terminals of ports 1 and 2.

Utilizing the assumptions above, it may be seen that since $V_{be}$ of transistor 28 equals zero voltage $V_2$ at port 2 appears across resistor 34. Since $I_b$ of transistor 20 equals zero, current $I_1$ at the positive terminal of port 1 must flow to collector 30 of transistor 28. Then, since $I_c=I_e$ of transistor 28, current $I_1$ at collector 30 flows through emitter 31 and causes the voltage drop, $I_1R_4$, across resistor 34 in the direction as shown. Since the voltage drop, $I_1R_4$, appears across resistor 34 in the same direction as $V_2$, $V_2=I_1R_4$ and equation (21) above is satisfied.

Similarly, since $I_b$ of transistor 28 equals zero, current $I_2$ flowing away from the positive terminal of port 2 must flow through resistor $R_3$ causing a voltage drop $I_2R_3$ in the direction as shown. Likewise, since $I_c=I_e$ of transistor 20, current $I_1$ flowing into the negative terminal of port 1 must flow through resistor 35 causing a voltage drop $I_1R_5$ in the direction as shown. In addition, by the analysis above $I_1$ also flows through resistor 34, causing a voltage drop $I_1R_4$ in the direction as shown. By Kirchhoff's voltage law the sum of the voltage drops in any circuit loop is equal to zero. Thus, taking a loop from the positive terminal of port 1 through base 21 emitter 23, resistor 35, resistor 33, base 29, emitter 31, resistor 34, emitter 27 and base 25 and to the negative terminal of port 1, results in the following equation:

$$-I_1R_5-I_2R_3+I_1R_4-V_1=0 \quad (22)$$

which is equivalent to equation (20) above. As a result, gyrator action is produced by the circuit shown in FIG. 4 when $R_4$ equals $R_5$ as specified by matrix equation (5).

A typical biasing arrangement is shown in combination with the apparatus of FIG. 4. Sources 100, 101, and 102 and zener diode 103 comprise the biasing arrangement. The function of each of the biasing elements 100, 101, 102, and 103 is to maintain transistors 20, 24, and 28 in their operating ranges. As is well known to those skilled in the art, a transistor is properly biased when the bias current flows in the direction of the arrow on the emitter electrode. In the case of NPN transistors this means that the bias voltage $V_{be}$ of the base with respect to the emitter and $V_{ce}$ of the collector with respect to the emitter are positive. Transistor 106 in bias source 102 supplies a bias current through transistor 28 in the direction of the arrow shown on emitter electrode 31 so that transistor 28 is biased in its operating range. Similarly, transistor 104 in bias source 100 supplies a bias current through transistors 20 and 24 in the direction of the arrow on emitter electrodes 23 and 27. Transistor 105 in bias voltage 101 draws a current through zener diode 103 causing a voltage to develop across zener diode 103. This condition ensures that $V_{be}$ and $V_{ce}$ of transistor 20 will be positive so that the bias current for transistor 20 will flow in the direction of the arrow on emitter electrode 23.

It should be noted at this point that the circuit shown in FIG. 4 is only one illustration of many circuits that may be constructed with the above analysis using matrix equation (5) and voltage and current equations (15), (16), (17), (18) and (19). By applying the nullator-norator analysis shown in FIGS. 1, 2 and 3, for example, other circuits having more than three transistors may be constructed by using a greater number of nullator and norator pairs to satisfy equations (15), (16), (17), (18) and (19). The common constraints in all the networks in the embodiment of the invention defined by matrix equation (5) are that three resistors, $R_3$, $R_4$ and $R_5$, are used to terminate ports 3, 4, and 5 and that $R_4$ must equal $R_5$ to produce gyrator action.

Figure 5:
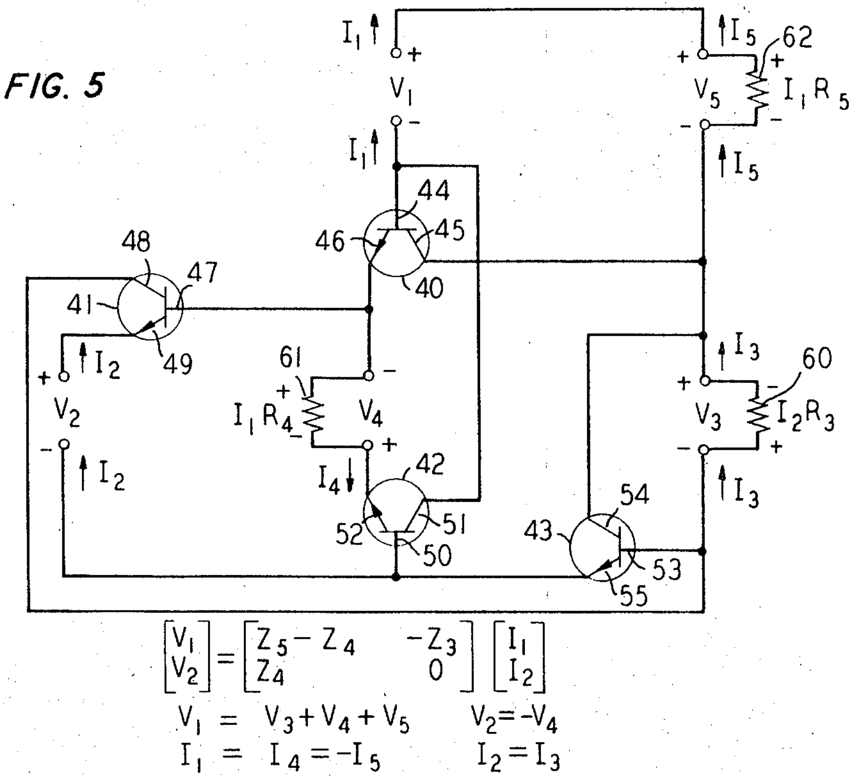
FIG. 5 is a schematic diagram of a gyrator circuit illustrating a second embodiment of the invention.

A four-transistor circuit illustrating the embodiment of the invention defined by matrix equation (6) is shown in FIG. 5. Again applying the above analysis and considering impedances $Z_3$, $Z_4$ and $Z_5$ as terminations of a five-port network implies the following voltage and current relationships which follow from matrix equation (6):

$$V_1=V_3+V_4+V_5 \quad (23)$$

$$V_2=-V_4 \quad (24)$$

$$I_1=I_4 \quad (25)$$

$$I_1=-I_5 \quad (26)$$

$$I_2=I_3 \quad (27)$$

By using an analysis similar to that shown for the nullator-norator models in FIGS. 1 and 2 above, a nullator-norator model may be constructed which satisfies matrix equation (6) and equations (23), (24), (25), (26) and (27). Then by applying the substitution shown in FIG. 3 for each nullator-norator pair a number of transistor circuits may be constructed from the model. The circuit shown in FIG. 5 is one specific illustration of a transistor circuit which follows from these models.

FIG. 5 is a five-port network containing four transistors, 40, 41, 42 and 43. Voltages $V_1$, $V_2$, $V_3$, $V_4$ and $V_5$ appear at corresponding ports 1, 2, 3, 4 and 5. Currents $I_1$, $I_2$, $I_3$, $I_4$ and $I_5$ are shown flowing away from the positive terminal and into the negative terminal of the respective ports 1, 2, 3, 4 and 5. Each of the four transistors contains base, collector and emitter electrodes, transistor 40 having base 44, collector 45 and emitter 46; transistor 41 having base 47, collector 48 and emitter 49; transistor 42 having base 50, collector 51 and emitter 52; and transistor 43 having base 53, collector 54 and emitter 55. Base 44 of transistor 40 is connected directly to the negative terminal of port 1 and collector 51 of transistor 42. Collector 45 is connected directly to the negative terminal of port 5 and the positive terminal of port 3, while emitter 46 is connected to the negative terminal of port 4 and base 47 of transistor 41. Collector 48 of transistor 41 is connected directly to the negative terminal of port 3 and base 53 of transistor 43. Emitter 49 of transistor 41 is connected directly to the positive terminal of port 2. Emitter 52 of transistor 42 is connected directly to the positive terminal of port 4 while base 50 is connected to the negative terminal of port 2 and collector 55 of transistor 43. Collector 54 of transistor 43 is connected directly to the positive terminal of port 3, the negative terminal of port 5 and collector 45 of transistor 40. In addition, the positive terminal of port 1 is connected directly to the positive terminal of port 5. Resistors 60, 61 and 62 having resistances of $R_3$, $R_4$ and $R_5$ are connected respectively across ports 3, 4 and 5.

If it is assumed that ideal transistors are used in the circuit shown in FIG. 5, it may be readily shown that voltage and current equations (23), (24), (25), (26) and (27) are satisfied.

Summing the voltages in the circuit loop from the positive terminal of port 1 through port 5, port 3, the base emitter junction of transistor 43, the base emitter junction of transistor 42, port 4 and the base emitter junction of transistor 40 to the negative terminal of port 1 shows that equation (23) is satisfied. Similarly, summing the voltages from the positive terminal of port 2 through the base emitter junction of transistor 41, port 4, the base emitter junction of transistor 42, and back to the negative terminal of port 2 shows that equation (24) is satisfied. Simple observation shows that $I_1=-I_5$ because of the direct connection from port 1 to port 5. Since $I_c=I_e$ of transistor 42, $I_1$ flowing into the negative terminal of port 1 equals $I_4$ flowing out of the positive terminal of port 4. Since $I_c=I_e$ of transistor 41 and since $I_b$ of transistor 43 equals 0, current $I_3$ flowing into the negative terminal of port 3 must equal $I_2$ flowing out of the positive terminal of port 2. Thus equations (25), (26) and (27) are satisfied.

That the circuit shown in FIG. 5 in addition satisfies matrix equation (6) and produces gyrator action when $R_4=R_5$ may be shown by the following analysis.

Substituting terminations $R_3$, $R_4$ and $R_5$ for impedances $Z_3$, $Z_4$ and $Z_5$ in matrix equation (6) and multiplying out matrix equation (6) yields the following pair of equations:

$$V_1=(R_5-R_4)I_1-R_3I_2 \quad (28)$$

$$V_2=R_4I_1 \quad (29)$$

Since $I_b$ of transistor 40 equals 0 and since $I_c=I_e$ of transistor 42, current $I_1$ flowing into the negative terminal of port 1 must flow through resistor 61 causing a voltage drop $I_1R_4$ in the direction as shown. Since $V_{be}$ of transistor 41 equals 0, voltage $V_2$ also appears across resistor 61 so that $V_2=R_4I_1$ and equation (29) is satisfied.

Because of the direct connection from the positive terminal of port 1 to the positive terminal of port 5, current $I_1$ must flow through resistor 62 causing a voltage drop $I_1R_5$ in the direction as shown. Since $I_c=I_e$ of transistor 41 and since $I_b$ of transistor 43 equals 0, current $I_2$ flowing out of the positive terminal of port 2 must flow through resistor 60 causing a voltage drop $I_2R_3$ in the direction as shown. Then, summing the voltages drops through port 1, resistor 62, resistor 60, the base emitter junction of transistor 43, the base emitter junction of transistor 42, resistor 61 and the base emitter junction of transistor 40 yields the following equation:

$$-V_1+I_1R_5-I_2R_3-I_1R_4=0 \quad (30)$$

Equation (30) simplified to equation (28) above. It may be readily seen that when $R_4=R_5$ equations (28) and (29) simplify to the form of equations (2) and (3) above so that gyrator action is produced between ports 1 and 2 of the circuit shown in FIG. 5.

In the same manner as demonstrated for the embodiments of the invention defined by matrix equations (5) and (6) above, the following set of voltage and current equations for a five-port network is implied by matrix equation (7).

$$V_1=V_3+V_5 \quad (31)$$

$$V_2=-V_4 \quad (32)$$

$$I_4=I_5 \quad (33)$$

$$I_1=I_5 \quad (34)$$

$$I_3=-I_1+I_2 \quad (35)$$

Figure 6:
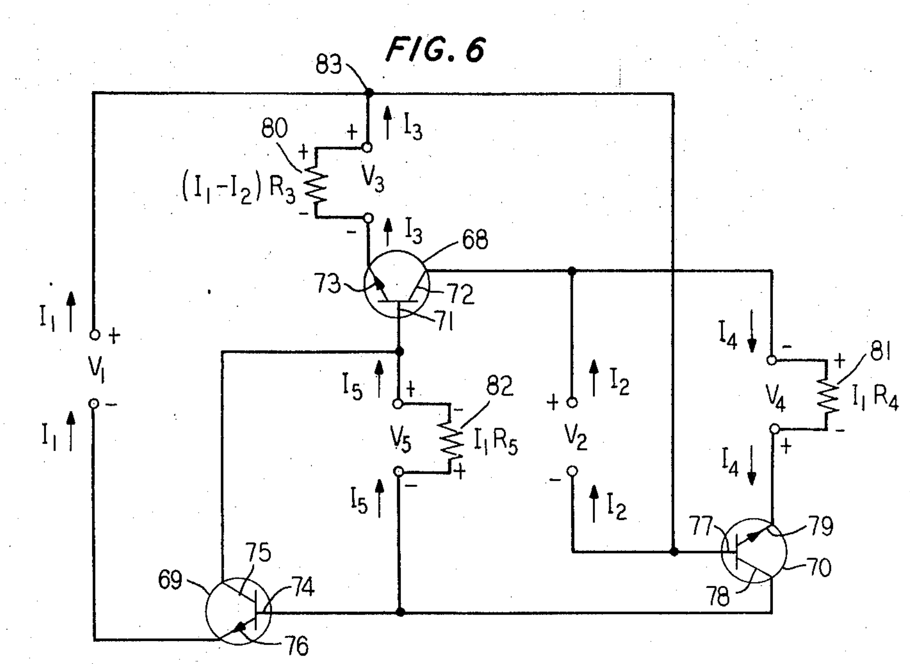
FIG. 6 is a schematic diagram of a gyrator circuit illustrating a third embodiment of the invention.

An illustrative transistor circuit which satisfies the embodiment of the invention defined by matrix equation (7) and voltage and current equations (31), (32), (33), (34) and (35) is shown in FIG. 6. Transistor circuits of the type shown in FIG. 6 may be constructed by the same process developed above for the transistor circuit shown in FIG. 4. As in the process above, the total number of transistors in the resultant network depends upon how many nullator-norator pairs are used in the various models.

The circuit shown in FIG. 6 is a five-port network containing three transistors, 68, 69 and 70. Voltages $V_1$, $V_2$, $V_3$, $V_4$ and $V_5$ appear at ports 1, 2, 3, 4 and 5, respectively. Currents $I_1$, $I_2$, i$I_3$, $I_4$ and $I_5$ are assumed to flow away from the positive terminals and into the negative terminals of the respective ports by the same convention as adopted in FIGS. 4 and 5 above. Each of the transistors in the circuit shown in FIG. 6 contains base, collector and emitter electrodes, transistor 68 having base 71, collector 72 and emitter 73; transistor 69 having base 74, collector 75 and emitter 76; transistor 70 having base 77, collector 78 and emitter 79. Base 71 of transistor 68 is connected directly to the positive terminal of port 5 and collector 75 to transistor 69; collector 72 is connected directly to the positive terminal of port 2 and the negative terminal of port 4. Emitter 73 of transistor 68 is connected directly to the negative terminal of port 3. Emitter 76 of transistor 69 is connected directly to the negative terminal of port 1 while base terminal 74 is connected to the negative terminal of port 5 and collector 78 of transistor 70. Emitter 79 of transistor 70 is connected directly to the positive terminal of port 4 while base terminal 77 is connected directly to the negative terminal of port 2 and the positive terminals of ports 1 and 3. The positive terminal of port 3 is also directly connected to the positive terminal of port 1. Resistors 80, 81 and 82 having resistances $R_3$, $R_4$ and $R_5$ are connected, respectively, across ports 3, 4 and 5.

That the circuit shown in FIG. 6 satisfies the voltage and current relationships in equations (31), (32), (33), (34) and (35) and produces gyrator action in accordance with matrix equation (7) above may be shown by the following analysis.

Assume ideal transistors are used. Then, since $I_c=I_e$ of transistor 69 and $I_b$ of transistor 68 equals zero, current $I_1$ flowing into the negative terminal of port 1 equals $I_5$ flowing out of the positive terminal of port 5 and equation (34) is satisfied. Also, since $I_c=I_e$ of transistor 70 and $I_b$ of transistor 69 equals zero, the current flowing out of the positive terminal of port 4 must equal current $I_5$ flowing into the negative terminal of port 5 so that equation (33) is satisfied. Since $I_b$ of transistor 70 equals zero, the sum of currents $I_1$ and $I_3$ flowing into node 83 must equal $I_2$ flowing into the negative terminal of port 2 so that equation (35) is satisfied. Since $V_{be}$ of transistor 70 equals zero, $V_2=-V_4$ so that equation (32) is satisfied. Similarly, since $V_{be}$ of transistors 68 and 69 equals zero, the voltages in the loop through port 1, port 3, the base-emitter junction of transistor 68, port 5 and the base-emitter junction of transistor 69 may be summed to show that equation (31) is satisfied.

Assuming that resistive terminations 80, 81 and 82 having resistances $R_3$, $R_4$ and $R_5$ are equivalent to impedances $Z_3$, $Z_4$ and $Z_5$ in matrix (7), the following pair of equations results:

$$V_1=(R_3-R_5)I_1-R_3I_2 \qquad (36)$$

$$V_2=R_4I_1 \qquad (37)$$

Applying an analysis similar to that used above shows that since $I_c=I_e$ of transistor 69 and $I_b$ of transistor 68 equals zero, current $I_1$ flowing into the negative terminal of port 1 must flow through resistor 82 causing a voltage drop $I_1R_5$ in the direction as shown. Further, since $I_c=I_e$ of transistor 70 and $I_b$ of transistor 69 equals zero, current $I_1$ flowing through resistor 82 must also flow through resistor 81 causing a voltage drop $I_1R_4$ in the direction as shown. Thus, since $V_{be}$ of transistor 70 equals zero, $V_2$ appears across resistor 81 in the same direction as voltage drop $I_1R_4$ so that $V_2=R_4I_1$ and equation (37) is satisfied. The current flow through resistor 80 is equal to the sum of two currents. First, since $I_c=I_e$ of transistor 68 current $I_1$ flowing through resistor 81 must also flow through resistor 80. In addition, since $I_b$ of transistor 70 equals zero, current $I_2$ flowing into the negative terminal of port 2 must flow through resistor 80. Since currents $I_1$ and $I_2$ flow through resistor 80 in opposite directions the total voltage generated across resistor 80 in the direction as shown is equal to $$(I_1-I_2)R_3 \qquad (38)$$

Now, summing the voltage drops through port 1, resistor 80, the base-emitter junction of transistor 68, resistor 82 and the base-emitter junction of transistor 69 results in the following equation:

$$-V_1+(I_1-I_2)R_3-I_1R_5=0 \qquad (39)$$

Grouping the terms in equation (39) shows the equation (39) is equal to equation (36) above. Further, equating resistance $R_5$ with resistance $R_3$ simplifies equations (36) and (37) to the form shown in equations (1) and (2) above. As a result gyrator action is produced between ports 1 and 2 for the network shown in FIG. 6 when $R_3$ equals $R_5$.

By again applying the analysis above and considering impedances $Z_3$, $Z_4$ and $Z_5$ as terminations of a five-port network, the following voltage and current relationships are implied from the embodiment of the invention defined by matrix equation (8):

$$V_1=V_3+V_5 \qquad (40)$$

$$V_2=-V_4 \qquad (41)$$

$$I_1=I_4 \qquad (42)$$

$$I_4=-I_5 \qquad (43)$$

$$I_3=I_1+I_2 \qquad (44)$$

By again using the nullator-norator analysis shown in FIGS. 1 and 2 above, many nullator-norator models may be constructed which satisfy equations (40), (41), (42), (43) and (44). One illustration of a transistor circuit which follows from these models is shown in FIG. 7.

Figure 7:
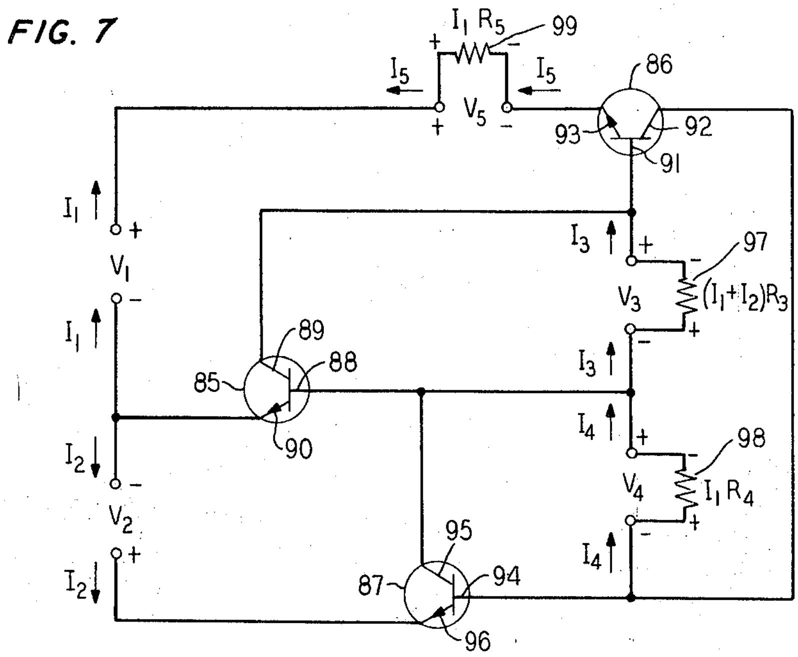
FIG. 7 is a schematic diagram of a gyrator circuit illustrating a fourth embodiment of the invention.

FIG. 7 is a five-port network containing three transistors 85, 86 and 87. Voltages $V_1$, $V_2$, $V_3$, $V_4$ and $V_5$ appear at correspondingly numbered ports 1, 2, 3, 4 and 5 as shown. By the convention adopted in FIGS. 4, 5 and 6 above, currents $I_1$, $I_2$, $I_3$, $I_4$ and $I_5$ are shown flowing away from the positive terminals and in the negative terminals of the respective ports. Each of the three transistors contains base, collector and emitter electrodes transistor 85 having base 88, collector 89, and emitter 90; transistor 86 having base 91, collector 92 and emitter 93; transistor 87 having base 94, collector 95 and emitter 96. Base 88 of transistor 85 is connected to the negative terminal of port 3, the positive terminal of port 5 and collector 95 of transistor 87. Collector 89 of transistor 85 is connected to base 91 of transistor 86 and the positive terminal of port 3. Emitter 90 is connected to the negative terminals of ports 1 and 2. Collector 92 of transistor 86 is connected to base 94 of transistor 87 and the negative terminal of port 4. Emitter 93 of transistor 91 is connected directly to the negative terminal of port 5, and emitter 96 of transistor 87 is connected directly to the positive terminal of port 2. The positive terminal of port 1 is connected directly to the positive terminal of port 5. Resistors 97, 98 and 99 having resistances $R_3$, $R_4$ and $R_5$ are shown connected respectively across ports 3, 4 and 5.

That the circuit shown in FIG. 7 satisfies voltage and current equations (40), (41), (42), (43) and (44) may be seen by simply applying the voltage and current techniques used in FIGS. 4, 5 and 6 above. That the circuit shown in FIG. 7 further satisfies matrix equation (8) and produces gyrator action when $R_3=R_5$ may be shown by the following analysis.

Assuming terminations 97, 98 and 99 having resistances $R_3$, $R_4$ and $R_5$ are equivalent to impedances $Z_3$, $Z_4$ and $Z_5$ in matrix equation (8) and multiplying out equation (8) yields the following pair of equations:

$$V_1=(R_5-R_3)I_1-R_3I_2 \qquad (45)$$

$$V_2=R_4I_1 \qquad (46)$$

Then assuming ideal transistors are used, voltage $V_2$ at port 2 appears across resistor 98 because $V_{be}$ of transistors 85 and 87 equals zero. Since $I_c=I_e$ of transistor 86 and $I_b$ of transistor 87 equals zero, current $I_1$ flowing out of the positive terminal of port 1 must flow through transistor 86 and resistor 98 causing a voltage drop $I_1R_4$ across resistor 98 in the direction as shown. Since the voltage drop $I_1R_4$ appears across resistor 98 in the same direction as voltage $V_2$, $V_2=R_4I_1$ and equation (46) is satisfied.

Similarly, since $I_b$ of transistor 86 equals zero and since $I_c=I_e$ of transistor 85, current $I_1+I_2$ flowing into the negative terminals of ports 1 and 2 must also flow through resistor 97 causing a voltage drop $(I_1+I_2)R_3$ in the direction as shown. In addition, current $I_1$ flowing out of the positive terminal of port 1 must flow through resistor 99 causing a voltage drop $I_1R_5$ in the direction as shown. Thus, summing the voltage drops in the circuit loop through port 1, resistor 99, the base-emitter junction of transistor 86, resistor 97 and the base-emitter junction of transistor 85 yields the following equation:

$$-V_1+I_1R_5-(I_1+I_2)R_3=0 \quad (47)$$

Regrouping the terms in equation (47) shows that equation (47) is equivalent to equation (45) above. As a result both equations (45) and (46) are satisfied by the circuit shown in FIG. 7. Gyrator action is produced when resistance $R_3$ equals resistance $R_5$, equations (45) and (46) then being in the form shown for equations (2) and (3 ) above.

While in the analysis above the voltage at port 1 is considered the input voltage and the voltage of port 2 the output voltage, it should be noted that the output terminals may alternately be considered the input terminals, and vice versa, without any material change in the analysis. The reversal of the input and output ports merely causes a change in the direction of gyration which is reflected by an interchange of subscripts 1 and 2 of the voltage and current equations above. As a result, while matrix equations (5), (6), (7) and (8) were concerned with tuning the input open circuit impedance, $Z_{11}$, to zero by adjusting the value of resistances $R_3$, $R_4$ and $R_5$, there is no material difference between these representations and those wherein the output open circuit impedance $Z_{22}$ is tuned in this manner. In addition, while the above analysis was expressed in terms of impedance matrices (5), (6), (7) and (8), there are well-known duals to these equations which are expressed in terms of admittance matrices. The synthesis technique above, however, is not affected by this change.

Thus, in accordance with this invention, a new class of gyrator networks is made available to the circuit designer providing him with the ability to tune external resistances in order to simulate high-quality inductors.

In conclusion, it should be understood that the above-described arrangements are merely illustrative of applications of the principles of the invention and that numerous other circuit arrangements may be devised by those skilled in the art without departing from the spirit and scope of the invention.

I claim:

1. In a five-port network having first, second, third, fourth and fifth ports a gyrator circuit comprising:

first, second and third impedances, $Z_3$, $Z_4$ and $Z_5$, respectively, forming terminations for said third, fourth and fifth ports, respectively;

said remaining two-port network being defined by the following equations, $$V_1=Z_{11}I_1+Z_{12}I_2$$
$$V_2=Z_{21}I_1+Z_{22}I_2$$

wherein $V_1$ is equal to the voltage at said first port, $V_2$ is equal to the voltage at said second port, $I_1$ is equal to the current measured into the network at said first port and $I_2$ is equal to the current measured into the network at said second port;

said impedance terms $Z_{11}$, $Z_{12}$, $Z_{21}$ and $Z_{22}$ in equations (1) and (2) having the following relationships to said first, second and third impedances in said five-port network;

$Z_{21}$ being the transfer impedance from port 2 to port 1 and having an impedance equal to one of the terminations of said five-port network;

$Z_{12}$ being the transfer impedance from port 1 to port 2 and having an impedance equal to the negative of the impedance of a second termination of said five-port network;

$Z_{11}$ being equal to the open circuit impedance at said first port and having an impedance equal to the difference between the impedance of a third termination and another of said terminations of said five-port network, the impedances of said third termination and said other termination being substantially equal so that their difference is substantially equal to zero; and $Z_{22}$ being the open-circuit impedance at said second port and having an impedance substantially equal to zero, whereby gyrator action is produced between said first and second ports.

2. Apparatus as defined in claim 1 wherein said impedance $Z_{21}$ is equal to said impedance $Z_4$, said impedance $Z_{12}$ is equal to the negative of impedance $Z_3$, said impedance $Z_{11}$ is equal to impedance $Z_4$ minus impedance $Z_5$, and wherein said impedance $Z_4$ is substantially equal to said impedance $Z_5$ so that said impedance $Z_{11}$ is substantially equal to zero.

3. Apparatus as defined in claim 1 wherein said impedance $Z_{21}$ is equal to impedance $Z_4$, said impedance $Z_{12}$ is equal to negative impedance $Z_3$, said impedance $Z_{11}$ is equal to impedance $Z_5$ minus impedance $Z_4$, and wherein said impedance $Z_5$ is substantially equal to impedance $Z_4$, so that said impedance $Z_{11}$ is substantially equal to zero.

4. Apparatus in accordance with claim 1 wherein said impedance $Z_{21}$ is equal to said impedance $Z_4$, said impedance $Z_{12}$ is equal to the negative of impedance $Z_3$, said impedance $Z_{11}$ is equal to impedance $Z_3$ minus impedance $Z_5$, and wherein said impedance $Z_3$ is substantially equal to impedance $Z_5$ so that said impedance $Z_{11}$ is substantially equal to zero.

5. Apparatus as defined in claim 1 wherein said impedance $Z_{21}$ is equal to impedance $Z_4$, said impedance $Z_{12}$ is equal to the negative of impedance $Z_3$, said impedance $Z_{11}$ is equal to $Z_5$ minus impedance $Z_3$, and wherein said impedance $Z_5$ is substantially equal to said impedance $Z_3$ so that said $Z_{11}$ is substantially equal to zero.

6. In a five-port network having first, second, third, fourth and fifth ports a gyrator circuit comprising:

first, second and third resistors having admittances $Y_3$, $Y_4$ and $Y_5$, respectively, forming terminations for said third, fourth and fifth ports, respectively;

said remaining two-port network being defined by the following equations, $$I_1=Y_{11}V_1+Y_{12}V_2$$
$$I_2=Y_{21}V_1+Y_{22}V_2$$

wherein $V_1$ is equal to the voltage at said first port, $V_2$ is equal to the voltage at said second port, $I_1$ is equal to the current measured into the network at said first port, and $I_2$ is equal to the current measured into the network at said second port;

said admittance terms $Y_{11}$, $Y_{12}$, $Y_{21}$ and $Y_{22}$ in equations (1) and (2) having the following relationships to said first, second and third resistors in said five-port network;

$Y_{21}$ being the transfer admittance from port 2 to port 1 and having an admittance equal to one of the terminations of said five-port network;

$Y_{12}$ being the transfer admittance from port 1 to port 2 and having an admittance equal to the negative of the admittance of a second termination of said five-port network;

$Y_{11}$ being equal to the short circuit admittance at said first port and having an admittance equal to the difference between the admittance of a third termination and another of said terminations of said five-port network, said third termination and said other termination being substantially equal so that their difference is substantially equal to zero; and $Y_{22}$ being the short circuit admittance at said second port and having an admittance substantially equal to zero, whereby gyrator action is produced between said first and second ports.

7. A five-port network comprising:

first, second, third, fourth and fifth ports;

each of said ports having a first terminal with a positive voltage reference and a second terminal with a negative voltage reference;

voltages $V_1$, $V_2$, $V_3$, $V_4$ and $V_5$ being measured across said terminals at ports 1, 2, 3, 4 and 5, respectively;

currents $I_1$, $I_2$, $I_3$, $I_4$ and $I_5$ measured respectively at ports 1, 2, 3, 4 and 5 into said network at said terminals with said positive voltage reference and out of said network at said terminals with said negative voltage reference;

first, second and third resistors having impedances $R_3$, $R_4$ and $R_5$ forming terminations for ports 3, 4 and 5, respectively;

said impedance $R_4$ of said fourth port being substantially equal to said impedance $R_5$ of said fifth port;

said voltages and currents appearing at said first, second, third, fourth and fifth ports having the following relationships:

$V_1=V_3-V_4+V_5$ $V_2=-V_4$ $I_3=I_2$ $I_4=I_1$ $I_5=I_1$ whereby the following matrix equation is satisfied:

$$\begin{bmatrix} V_1 \\ V_2 \end{bmatrix} = \begin{bmatrix} R_4-R_5 & -R_3 \\ R_4 & 0 \end{bmatrix} \begin{bmatrix} I_1 \\ I_2 \end{bmatrix}$$

and gyrator action is produced between said first and second ports.

8. A five-port network comprising:

first, second, third, fourth and fifth ports;

each of said ports having a first terminal with a positive voltage reference and a second terminal with a negative voltage reference;

voltages $V_1$, $V_2$, $V_3$, $V4$ and $V_5$ being measured across said terminals at port 1, 2, 3, 4 and 5, respectively;

currents $I_1$, $I_2$, $I_3$, $I_4$ and $I_5$ measured respectively at ports 1, 2, 3, 4 and 5 into said network at said terminals with said positive voltage reference and out of said network at said terminals with said negative voltage reference;

first, second and third resistors having impedances $R_3$, $R_4$ and $R_5$ forming terminations for ports 3, 4 and 5, respectively;

said impedance $R_4$ of said fourth port being substantially equal to impedance $R_5$ of said fifth port;

said voltages and currents at said ports 1, 2, 3, 4 and 5 having the following relationships:

$V_1=V_3+V_4+V_5$ $V_2=-V_4$ $I_1=I_4$ $I_1=-I_5$ $I_2=I_3$ whereby the following matrix equation is satisfied:

$$\begin{bmatrix} V_1 \\ V_2 \end{bmatrix} = \begin{bmatrix} R_5-R_4 & -R_3 \\ R_4 & 0 \end{bmatrix} \begin{bmatrix} I_1 \\ I_2 \end{bmatrix}$$

and gyrator action is produced between said first and second ports.

9. A five-port network comprising:

first, second, third, fourth and fifth ports;

each of said ports having a first terminal with a positive voltage reference and a second terminal with a negative voltage reference;

voltages $V_1$, $V_2$, $V_3$, $V_4$ and $V_5$ being measured across said terminals at ports 1, 2, 3, 4 and 5, respectively;

currents $I_1$, $I_2$, $I_3$, $I_4$ and $I_5$ measured respectively at ports 1, 2, 3, 4 and 5 into said network at said terminal with said positive voltage reference and out of said network at said terminal with said negative voltage reference;

first, second and third resistors having impedances, $R_3$, $R_4$ and $R_5$ forming terminations for ports 3, 4 and 5, respectively;

said impedance $R_3$ at said third port being substantially equal to said impedance $R_5$ at said fifth port;

said voltages and currents at said first, second, third, fourth and fifth ports having the following relationships:

$V_1=V_3+V_5$ $V_2=-V_4$ $I_4=I_5$ $I_1=I_5$ $I_3=-I_1+I_2$ whereby the following matrix equation is satisfied:

$$\begin{bmatrix} V_1 \\ V_2 \end{bmatrix} = \begin{bmatrix} R_3-R_5 & -R_3 \\ R_4 & 0 \end{bmatrix} \begin{bmatrix} I_1 \\ I_2 \end{bmatrix}$$

and gyrator action is produced between said first and second ports.

10. A five-port network comprising:

first, second, third, fourth and fifth ports;

each of said ports having a first terminal with a positive voltage reference and a second terminal with a negative voltage reference;

voltages $V_1$, $V_2$, $V_3$, $V_4$ and $V_5$ being measured across said terminals at ports 1, 2, 3, 4 and 5, respectively;

currents $I_1$, $I_2$, $I_3$, $I_4$ and $I_5$ measured respectively at ports 1, 2, 3, 4 and 5 into said network at said terminal with said positive voltage reference and out of said network at said terminal with said negative voltage reference;

first, second and third resistors having impedances $R_3$, $R_4$ and $R_5$ forming terminations for ports 3, 4 and 5, respectively;

said resistance $R_3$ at said third port being substantially equal to said resistance $R_5$ at said fifth port;

said voltages and currents at first, second, third, fourth and fifth ports having the following relationships:

$V_1=V_3+V_5$ $V_2=-V_4$ $I_1=I_4$ $I_4=-I_5$ $I_3=I_1+I_2$ whereby the following matrix equation is satisfied by the said first and second ports:

$$\begin{bmatrix} V_1 \\ V_2 \end{bmatrix} = \begin{bmatrix} R_5-R_3 & -R_3 \\ R_4 & 0 \end{bmatrix} \begin{bmatrix} I_1 \\ I_2 \end{bmatrix}$$

and gyrator action is produced between said first and second ports.

* * * * *